W. W. TUCK.
VEGETABLE CUTTING APPARATUS.
APPLICATION FILED SEPT. 25, 1918.

1,303,617.

Patented May 13, 1919.
5 SHEETS—SHEET 1.

Inventor:
William W. Tuck,
By his Attorney
Geo. W. Hiatt

W. W. TUCK.
VEGETABLE CUTTING APPARATUS.
APPLICATION FILED SEPT. 25, 1918.

1,303,617.

Patented May 13, 1919.
5 SHEETS—SHEET 3.

W. W. TUCK.
VEGETABLE CUTTING APPARATUS.
APPLICATION FILED SEPT. 25, 1918.

1,303,617.

Patented May 13, 1919.
5 SHEETS—SHEET 4.

Inventor:
William W. Tuck,
By his Attorney
Geo. W. Hiatt

UNITED STATES PATENT OFFICE.

WILLIAM W. TUCK, OF RICHMOND HILL, NEW YORK.

VEGETABLE-CUTTING APPARATUS.

1,303,617.　　　　　Specification of Letters Patent.　　Patented May 13, 1919.

Application filed September 25, 1918. Serial No. 255,595.

*To all whom it may concern:*

Be it known that I, WILLIAM W. TUCK, a citizen of the United States, and a resident of Richmond Hill, county of Queens, and State of New York, have invented certain new and useful Improvements in Vegetable-Cutting Apparatus, of which the following is a specification.

My invention relates to means for cutting and shaping vegetables, particularly potatoes, and is designated to afford simple but effective apparatus that may be operated at relatively high speed, so as to attain a maximum of output of product. Other objects are the attainment of an automatic feed, single or plural; adapting the apparatus to the production of raw material for either "Saratoga chips", "French fried", (so called) or cubic forms of potato, as may be required; and other features hereinafter fully set forth and claimed specifically.

In the accompanying drawings.

Figure 21:
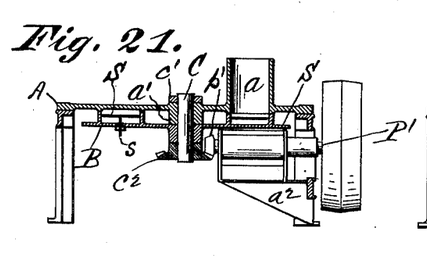
Fig. 21 is a central vertical section on a smaller scale, illustrating a modification in the driving of the knife disk.

The table plate A, is secured to a suitable supporting frame A', and is formed with one or more vegetable pockets $a$. Rotatably suspended underneath the table plate A, is the knife disk B, rigidly attached to a vertical shaft C, the upper portion of which passes through a bearing sleeeve $a'$, formed for the purpose on the under side of said table A. In Figs. 1, 2, 3, and 20 of the drawings, the gear $c$, secured rigidly to the top of the vertical shaft C, rests on the table A, and thus sustains the said knife disk in position. In Fig. 21 the nut $c'$, sustains the shaft C, in like manner.

Figure 22:
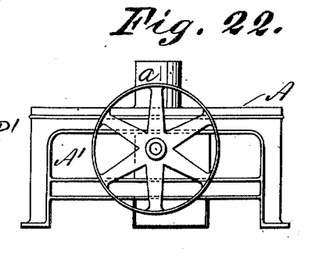
Fig. 22 is a side elevation of the parts shown in Fig. 21.

In the arrangement of parts shown in Figs. 21 and 22 the shaft C, and rotatable knife disk B, are driven by means of a pinion $p'$, on the inner end of the driving shaft P', mounted in suitable bearings on a bracket $a^2$, attached to the frame A', said pinion $p'$, meshing with a gear $c^2$, secured to the lower portion of the said vertical shaft C.

In the arrangement of parts shown in the other figures of the drawings, and particularly in Figs. 1, 2, 3 and 20, the vertical shaft C, is driven by a pinion $p$, meshing with the gear $c$, on the upper end of said shaft and attached to the driving shaft P, which is mounted in suitable bearings $a^3$, $a^3$, on top of the table A. In this case the vertical shaft C, passes through the hub $d$, of a stationary gear $d'$, which is keyed to the bearing sleeve $a'$, on the table plate A, as shown more particularly in Fig. 3. The object of this stationary gear $d'$, is to afford means for the rotation, through the medium of the pinion $e$, of the shaft $e'$, when the cutter frame E, is attached to the rotatable disk B, for the purpose of providing for the making of material for "French fried" or cubical potato products.

The potatoes in the pocket or pockets $a$, are cut into slices by means of a slicing plate S, and knife $b$, both mounted on the rotatable disk B, as shown in Figs. 3, 6, 7, 8 and 21. The lower portions of potato in the pocket or pockets $a$, rest upon the top of this spacing plate S, which supports such lower potato portions until they are severed by the cutting blade $b$, mounted on the raised portion $b'$, of the rotatable disk B. The slices of potato as severed drop through the throat opening $b^2$, in the rotatable plate B.

It is obvious that the distance between the knife blade $b$, and the top of the spacing and slicing plate S, will determine the thickness of the portions severed from the potatoes held by the holder or holders $a$. For this reason I provide for the regulation of the space between said cutting edge $b$, and the plate S. This may be accomplished by making either part named adjustable with relation to the other. In the drawings I show means for adjusting the slicing and spacing plate S, with relation to the blade $b$, although I do not wish to limit myself in this respect as various other and well known mechanical expedients may be resorted to with like result. As shown by way of illustration in Figs. 7 and 8, the slicing plate S, is supported on the rotatable disk B, by means of screw posts $s$, $s$, controlled by adjusting nuts $s'$, $s'$, journaled on said disk B. Thus, if very thin slices of potato are required for the making of "Saratoga chips" or the like, the plane of the slicing plate S, is positioned but slightly below that of the cutting blade $b$; whereas if slices from which to cut slivers suitable for the making of "French fried" or cubical potatoes are required the spacing and slicing plate S, is positioned below the level of the knife $b$, a distance equal to the cross section of the product desired.

Figure 12:
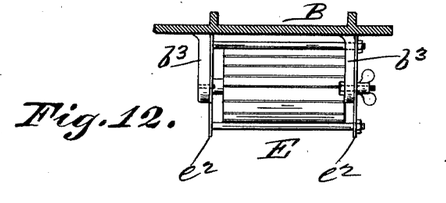
Fig. 12 is a sectional detail showing the means for suspending the cutter frame on the under side of the knife disk.

When the slicing is for "Saratotga chips" or like plain product the cutter frame E, is dispensed with,—the slices of potato severed by the blade $b$, simply dropping through the throat $b^2$, in the rotatable plate or disk B, onto a suitable receptacle provided below. When elongated strips of potato are required, as for the making of "French fried", the cutter frame E, is attached to the under side of the rotatable disk B, in a position to receive the slices delivered through the throat $b^2$ of said disk. The means of the attachment of the cutter frame E, to the disk is not material. That shown in the drawings consists in securing the side plates $e^2$, $e^2$, of the frame E, to pendent lugs $b^3$, $b^3$, on the under side of the rotatable disk B, as shown in Fig. 12.

On the shaft $e'$, is mounted a series of radial cutting blades $e^x$, which act in conjunction with an opposed platen $h$, to sever the slices of potato into elongated strips. The distance between the cutters $e^x$, is equivalent, preferably, to the thickness of the sliced material, so that the said elongated strips will be square in cross section or approximately so. The platen member $h$ may consist of a stationary abutment or cross bar between the frame plates $e^2$, $e^2$, as in Fig. 19, or of a rotatable cylinder, as in Fig. 13, in which latter case the platen drum is formed with longitudinal peripheral grooves $h'$, for the accommodation of the cutting edges of the blades $e^x$, to assist in the shearing off of the slices of potato, and to prevent the dulling of said cutting edges. When this platen drum is used it is rotated in unison with the shaft $e'$, and cutters $e^x$, by means of a gear $e''$, on said shaft $e'$,—said gear $e''$, meshing with a corresponding spur gear $h^2$, on the shaft $h^3$, to which the platen drum $h$, is rigidly secured between the side plates $e^2$, $e^2$, of the frame E on which the platen shaft $b^3$, is journaled.

Figures 13, 17:
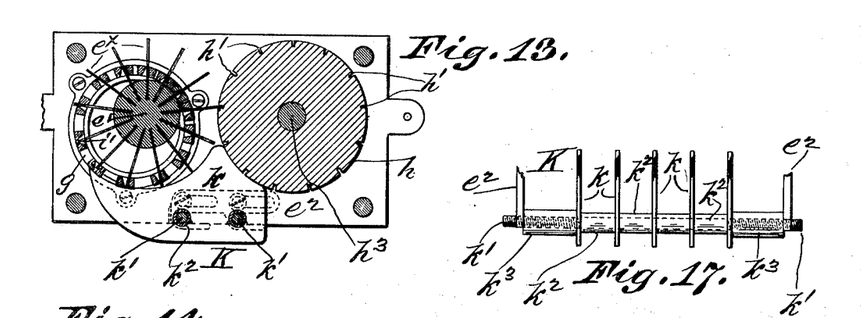
Fig. 13 is a section taken upon plane of line 13—13, Fig. 11.
Fig. 17 is a detail view of the gang of cuber knives.
Figures 14, 18:
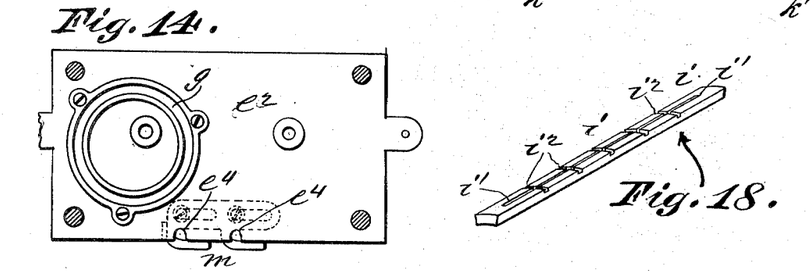
Fig. 14 is a view of the inner side of the frame plate shown in Fig. 13.
Fig. 18 is a detail view of one of the stripper bars.
Figures 15, 19:
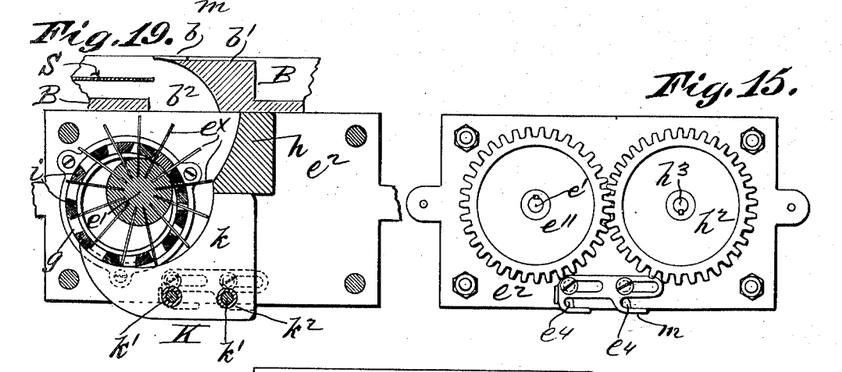
Fig. 15 is an elevation of the outer side of the frame plate shown in Fig. 13, showing the transmitting gears.
Fig. 19 is a view similar to Fig. 13, showing a modification.
Figure 16:
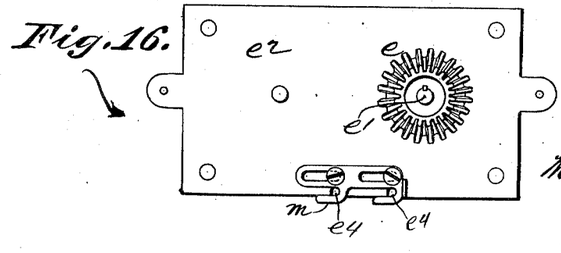
Fig. 16 is an elevation of the other side plate of the cutter frame.
Figure 20:
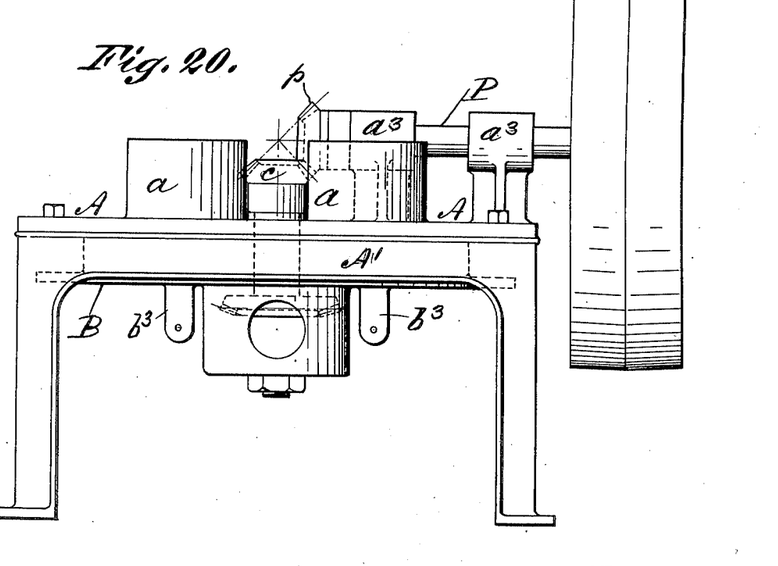
Fig. 20 is an elevation like unto Fig. 2, with the cutter frame removed.

In order to insure the clean stripping of the elongated portions of potato severed from the slices thereof by cutters $e^x$, I provide a series of stripping bars $i$, $i$, $i$, one for each cutter $e^x$. Each of these stripping bars $i$, may be formed with a longitudinal slot $i'$, as in Fig. 18, to enable it to straddle a cutter blade $e^x$, as in Fig. 13, or the stripping bars $i$, may be solid in cross section and simply rest between adjacent blades $e^x$, as in Fig. 19. In either case the extremities of the stripping bars $i$, are supported in annular grooves $g$, provided for the purpose on the inner sides of the side plates $e^2$, $e^2$, of the cutter frame E. These stripper-controlling grooves $g$, are positioned eccentrically to the axis of the cutter shaft $e'$, as shown in Figs. 13, 14, and 19, so that as said shaft $e'$, rotates the cutter blades $e^x$, will carry the stripper bars with them but the side walls of the grooves $g$, will otherwise control the position of said stripping bars $i$, with relation to the cutters $e^x$. In other words, the eccentric grooves $g$, cause the stripping bars to recede from the outer ends or edges of the cutting blades $e^x$, prior to the contact of the latter with the slices of potato and then after the severance of the elongated portions of potato from the slices thereof, to gradually advance and positively strip the severed portions from the cutters $e^x$.

When the gang K, of cuber knives is used for the purpose of subdividing the elongated portions of potato as produced by the rotary cutters $e$, into squares, as would be the case in Figs. 13 and 19, the stripping bars also perform the additional function of positively pressing said elongated portions of potato evenly and firmly against and beyond the cutting edges of said cuber knives $k$,—it being understood, of course, as before intimated, that in the absence of the gang K, of cuber knives $k$, the elongated portions of potato severed from the slices thereof simply drop through the cutter frame onto a suitable receiving surface provided for the purpose.

The gang of cuber knives consists of a suitable plurality of blades $k$, spaced apart and supported on cross rods $k'$, $k'$, in any expedient manner. In Fig. 17, the blades $k$, are shown as spaced apart on the rods $k'$, $k'$, by washer sleeves $k^2$, $k^2$, and held in position by nut sleeves $k^3$, $k^3$, engaging the threaded ends of said rods $k'$, $k'$. The gang K, of cuber knives $k$, may be detachably supported in position upon and between the side plates $e^2$, $e^2$, of the cutter frame E, with the knives $k$, extending at right angles to the rotatable cutters $e^x$, by any suitable mechanical expedient, as by the latches $m$, $m$, or by any equivalent means. In the arrangement shown, the latches $m$, $m$, are slidably supported on the side plates $e^2$, $e^2$, of the cutter frame E, said side frames $e^2$, $e^3$, being formed with notches $e^4$, $e^4$, for the reception of the ends of the cross rods $k'$, $k'$, and the latches being employed to support said rods $k'$, $k'$, when the cuber knives $k$, $k$, are to be used in conjunction with the rotatable cutters $e^x$, as hereinbefore stated. The stripper bars $i$, are formed with transverse grooves $i^2$, coincident in position and alinement with the cuber knives $k$, the cutting edges of which enter said grooves $i'$, and are protected thereby while insuring perfect severance and clearance of the potato cubes.

Figure 1:
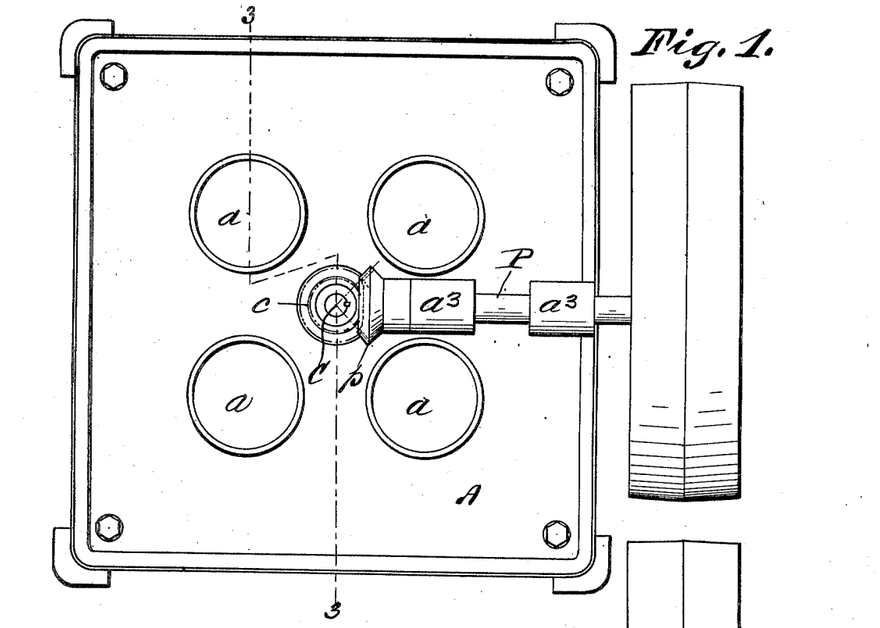
Figure 1 is a plan of the apparatus, the feed hopper being omitted.
Figure 2:
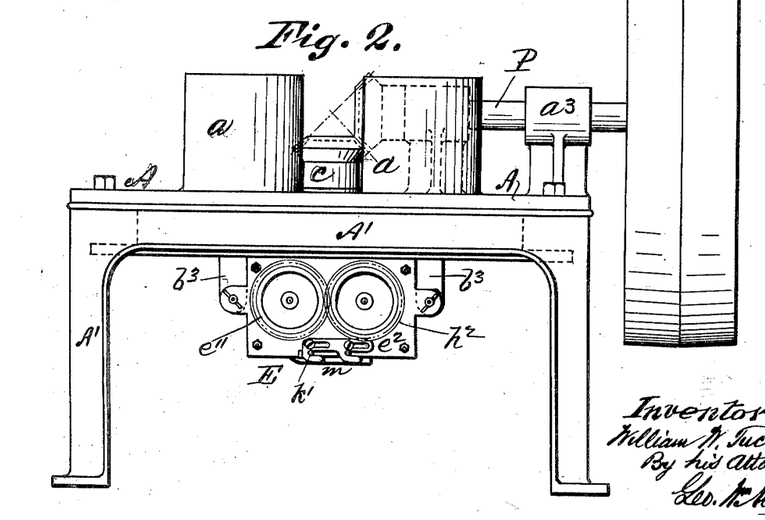
Fig. 2 is a side elevation of the parts shown in Fig. 1.
Figure 3:
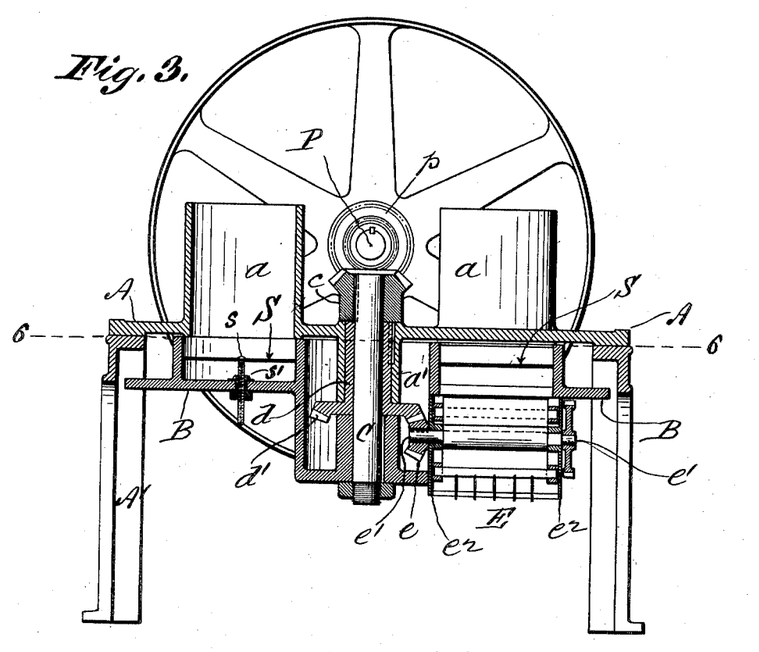
Fig. 3 is a vertical sectional elevation taken upon plane of line 3—3, Fig. 1.
Figures 4, 5, 11:
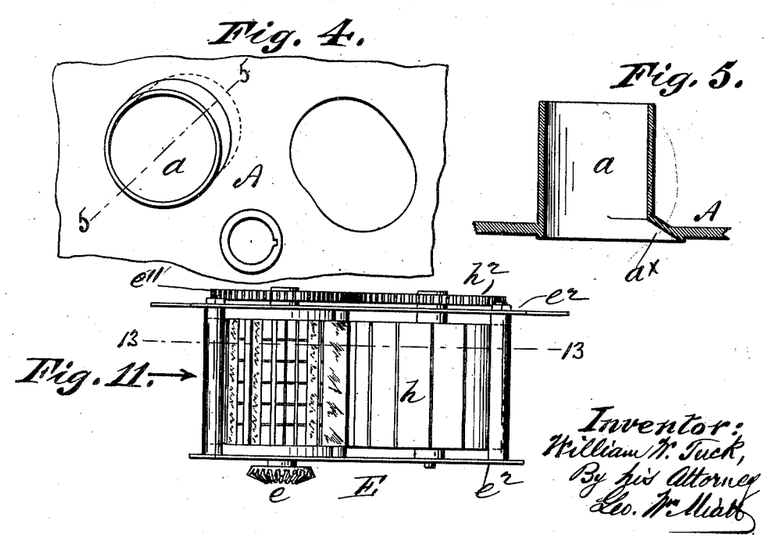
Fig. 4 is a top view of a portion of the table plate.
Fig. 5 is a vertical section taken upon plane of line 5—5, Fig. 4, showing one of the vegetable pockets in detail.
Fig. 11 is a top view of the cutter frame detached from the knife disk.
Figures 6, 7, 8, 9, 10:
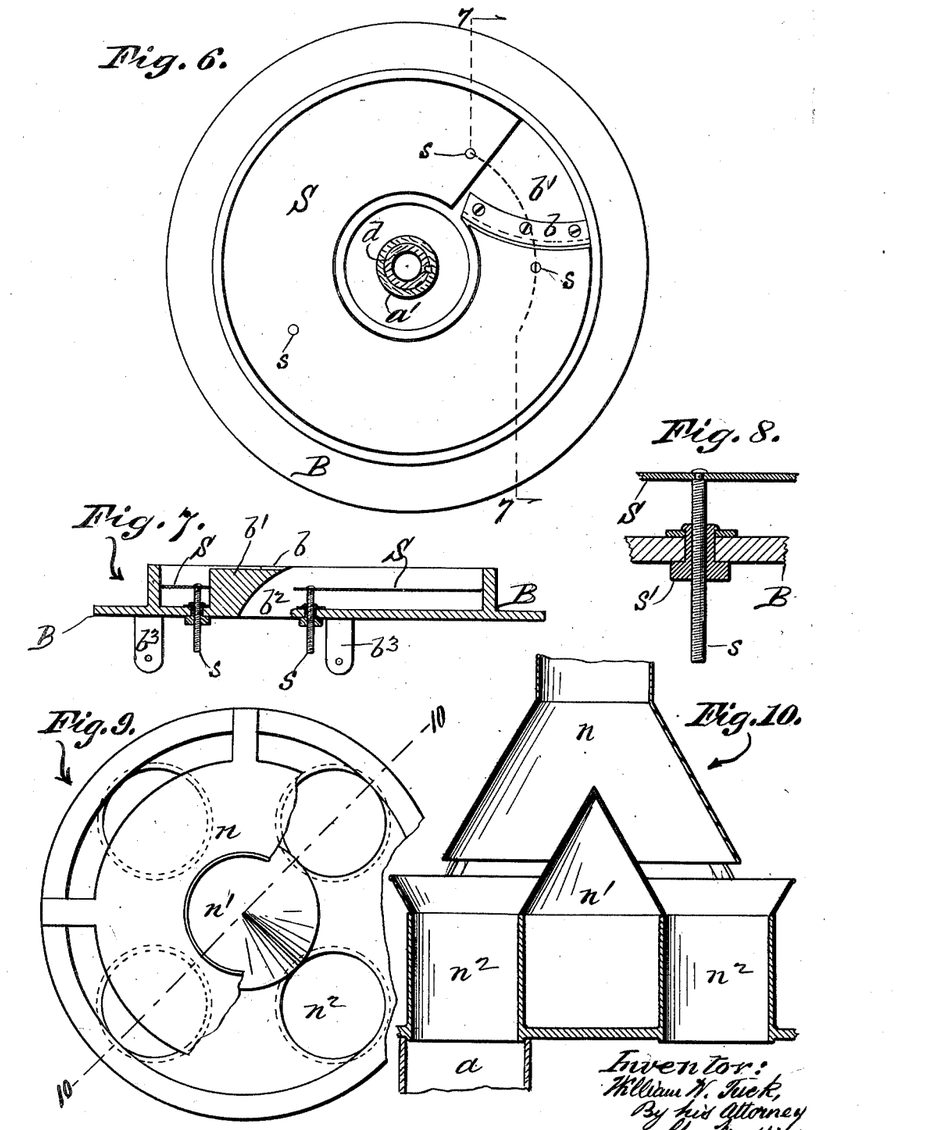
Fig. 6 is a horizontal section taken upon plane of line 6—6, Fig. 3; showing a plan of the knife disk and slicing plate.
Fig. 7 is a section taken upon plane of line 7—7, Fig. 6.
Fig. 8 is an enlarged sectional detail of one of the adjustable slicer plate posts.
Fig. 9 is a top view, partly broken away, of the feed hopper.
Fig. 10 is a vertical section of the feed hopper taken upon plane of line 10—10, Fig. 9.

The peeled potatoes may be fed to the holding pocket or pockets $a$, by hand, or automatically. For the latter purpose I provide a feed hopper, as for the plurality of holder pockets $a$, shown in the drawings. This may consist of a supply duct $n$, positioned over a conical distributer $n'$, which will guide the potatoes into the tubes $n^2$, by which the potatoes are delivered to the holding pockets $a$,—it being understood that the feed hopper fits over and is supported by the side walls of said holding pockets with the delivery tubes in coincidence therewith. The lower ends of the holder pockets $a$, are preferably flared, as at $a^x$, Fig. 5, in the direction of rotation of the knife disk B, underneath, so that the tendency of the potatoes under treatment will be to wedge themselves between the inclined surface $a^x$, and the upper surface of the slicing plate S, thus holding them down, especially after partial reduction.

I have herein shown and described my apparatus as used for the cutting and shaping of potatoes, although I do not limit myself to that particular purpose, as the essential features of my invention are applicable to the expeditious cutting of other vegetables and substances.

Distinctive features of my invention are the rotatable knife disk B, and spacing and slicer plate S. These enable me to use any number of potato holding pockets $a$, according to the output of product desired, and to speed up the production when necessary. Another important feature is the use of eccentrically mounted stripping bars $i$, which insure smooth running and perfection of shape of product, by preventing jamming or mashing of the elongated strips cut from the sliced potato or other vegetable or substance treated.

Furthermore simple provision is made for adjustment of parts to regulate size of product, and for removal of parts for cleansing purposes.

It may be noted in this connection that I provide for three independent products by making the knife frame E, detachable from the rotatable cutter disk B, and the cuber gang K, of knives detachable from the said cutter frame E. Thus with the cutter frame E, removed as in Fig. 20, the apparatus is adapted to the formation of slices for Saratoga chips and the like; with the cutter frame E, attached, but without the cuber knife gang K, to the formation of elongated strips for "French fried" potatoes and the like; and with the cuber knife gang K, added, to the formation of potato cubes for cooking or treatment for dehydrating.

The latter is far the more important use of all, as while adapted for use in connection with hotels, restaurants, etc., my apparatus is designed more especially for use in connection with the manufacture of dehydrated vegetable and fruit cubes for the use of the army and navy, and analogous purposes.

It is to be understood that by the use of the term "rotatable disk" as employed herein I mean to include any rotatable plate that will answer the purpose set forth.—"rotatable knife disk B," being used herein as a means of differentiating from the spacing and slicing plate S, carried thereon. Also that by the use of the term sliceable matter I mean to designate any vegetable or other matter adapted to be sliced as herein set forth.

What I claim as my invention and desire to secure by Letters Patent is,

1. In apparatus of the character designated, a rotary cutter disk embodying a cutter, a cutter frame carried by and rotating with said disk and provided with radial cutting blades, a platen coöperating with said blades, means for rotating the cutter shaft carried by said cutter frame and platen in unison, and a series of stripping bars provided with slots and positioned eccentrically to the axis of the shaft of said cutter frame.

2. In apparatus of the character designated, a rotary cutter disk embodying a cutter, a cutter frame carried by and rotating with said disk and provided with radial cutting blades, a platen coöperating with said blades, means for rotating said cutters and platen in unison, and a series of stripping bars provided with slots and positioned eccentrically to the axis of the shaft of said cutter frame, said cutter frame having eccentric grooves in its side walls and said stripper bars being movable in said grooves.

3. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, stripping bars actuated by the said series of rotatable cutters, the carrier for said cutters having annular grooves positioned eccentric to the axis of rotation of said series of rotatable cutters and in which said stripping bars are disposed, and means for holding and presenting sliceable material to the action of said rotatable knife disk and slice-spacing plate, for the purpose described.

4. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, a gang of cuber knives positioned at right angles to said series of rotatable cutters and below the same and arranged to intercept the material severed thereby, and means for holding and presenting sliceable material to the action of said rotatable knife disk and slice-spacing plate, for the purpose described.

5. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, stripping bars formed with transverse peripheral grooves and actuated by the said series of rotatable cutters, the carrier for said cutters having annular grooves positioned eccentric to the axis of rotation of said series of rotatable cutters and in which said stripping bars are disposed, a gang of cuber knives positioned at right angles to said series of rotatable cutters, below the same and in alinement with the transverse peripheral grooves in said stripping bars, and arranged to intercept the material severed by said rotary cutters, and means for holding and presenting sliceable material to the action of said rotatable knife disk and slice-spacing plate, for the purpose described.

6. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, stripping bars actuated by the said series of rotatable cutters, the carrier for said cutters having annular grooves positioned eccentric to the axis of rotation of said series of rotatable cutters and in which said stripping bars are disposed, a gang of cuber knives positioned at right angles to said series of rotatable cutters and below the same and arranged to intercept the material severed thereby and forwarded by said eccentric series of strippers, and means for holding and presenting sliceable material to the action of said rotatable knife disk and slice-spacing plate, for the purpose described.

7. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, stripping bars actuated by the said series of rotatable cutters, the carrier for said cutters having annular grooves positioned eccentric to the axis of rotation of said series of rotatable cutters and in which said stripping bars are disposed, a gang of cuber knives detachably positioned with relation to said series of rotatable cutters and below and at right angles thereto, and arranged to intercept the material severed thereby, and means for holding and presenting sliceable material to the action of said rotatable knife disk and slice-spacing plate, for the purpose described.

8. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters and an opposed platen detachably mounted on the under side of said rotatable knife disk adjacent to its said discharge throat, a gang of cuber knives detachably positioned with relation to said series of rotatable cutters and below and at right angles thereto and arranged to intercept the material severed thereby, and means for holding and presenting sliceable material to the action of said rotatable knife disk and slice-spacing plate, for the purpose described.

9. In apparatus of the character designated, in combination, a rotatable knife disk, a cutter blade mounted thereon, said knife disk being formed with a discharge throat under and adjacent to said cutter blade, a slice-spacing plate mounted on said rotatable knife disk, a series of rotatable cutters mounted on the under side of said rotatable knife disk adjacent to its said discharge throat, a platen on the under side of said knife disk opposed to said series of rotatable cutters, stripping bars actuated by the said series of rotatable cutters, the carrier for said cutters having annular grooves positioned eccentric to the axis of rotation of said series of rotatable cutters and in which said stripping bars are disposed, longitudinally slotted stripping bars straddling said rotatable cutters and actuated thereby and supported in annular grooves positioned eccentric to the axis of rotation of said series of rotatable cutters, and means for holding and presenting sliceable material to the action of said rotatable disk and slice-spacing plate, for the purpose described.

10. In apparatus of the character designated, in combination, a perforated plate, a rotatable knife disk suspended beneath the same, a cutter blade mounted thereon, a cutter shaft carrying a series of rotatable knives and supported from said disk, said knife disk being formed with a discharge throat under and adjacent to said cutter blade, a slice-spacing plate mounted on said knife disk, means for adjusting said plate and a plurality of stationary holders arranged to present sliceable material to the action of said rotatable knife disk and slice-spacing plate, for the purpose described.

11. In apparatus of the character designated, in combination, a perforated plate, a rotatable knife disk suspended beneath the same, a cutter blade mounted thereon, a cutter shaft carrying a series of rotatable knives and supported from said disk, said knife disk being formed with a discharge throat under and adjacent to said cutter blade, a slice-spacing plate mounted on said knife disk, means for adjusting said plate, a plurality of stationary holders arranged to present sliceable material to the action of said rotatable knife disk and slice-spacing plate, and a feed for said plurality of holders fitting thereon and formed with a conoidal central member arranged to distribute the sliceable material to the several holders, for the purpose described.

12. In apparatus of the character designated, in combination, a perforated plate, a rotatable knife disk suspended beneath the same, a cutter blade mounted thereon, a cutter shaft carrying a series of rotatable knives and supported from said disk, said rotatable knife disk being formed with a discharge throat under and adjacent to said cutter blade, a slice-spacing plate mounted on said knife disk, means for adjusting said plate, a series of rotatable cutters positioned below said rotatable knife disk, a platen opposed thereto, and a stationary feed pocket above the rotatable knife disk in substantial alinement with the rotatable cutters and platen below said rotatable knife disk, for the purpose described.

13. In apparatus of the character designated, in combination, a rotatable knife disk, a cutter blade mounted thereon, said rotatable knife disk being formed with a discharge throat under and adjacent to said cutter blade, a slice-spacing plate mounted on said knife disk, a series of rotatable cutters and an opposed platen positioned below said rotatable disk and arranged to receive the sliced material from its discharge throat, stripper plates eccentrically mounted and movable with relation to said cutters, a series of cuber knives positioned below said rotatable cutters and platen and arranged to receive and subdivide the strips of sliceable matter derived therefrom, and means for holding and presenting sliceable material to the action of said rotatable knife disk and slice-spacing plate, for the purpose described.

14. In apparatus of the character designated, in combination, a rotatable knife disk, a cutter blade mounted thereon, said rotatable knife disk being formed with a discharge throat under and adjacent to said cutter blade, a slice-spacing plate mounted on said knife disk, a series of rotatable cutters and an opposed platen positioned below said rotatable disk and arranged to receive the sliced material from its discharge throat, stripper bars actuated by said rotatable cutters, the carrier for said cutters having annular grooves positioned eccentric to the axis of rotation of said rotatable cutters and in which said stripping bars are disposed, a series of cuber knives positioned below said rotatable cutters, strippers, and platen, and arranged to receive and subdivide the strips of sliceable material derived therefrom, and means for holding and presenting sliceable material to the action of said rotatable knife disk and slice-spacing plate, for the purpose described.

15. In apparatus for cutting vegetables, a horizontal perforated plate, a knife disk rotatably suspended beneath the same and substantially parallel therewith, and means for presenting and holding sliceable material thereto, a rotatable shaft with a series of rotary cutters carried by and beneath said disk and means for giving rotary motion to said disk independently of said presenting and holding means.

16. In a machine of the character designated, a rotatable knife disk, a shaft rotatably mounted on said disk and carrying a series of cutters, and a series of stripping bars arranged concentrically, eccentric to the shaft of said cutters and movable with relation to the cutters.

17. In a machine of the character designated, a rotatable knife disk, a shaft rotatably mounted on said disk and carrying a series of rotary cutters, a series of stripping bars concentrically arranged eccentric with relation to the cutter shaft and movable with relation to the cutters, and a gang of cuber knives disposed beneath said stripping bars whereby the said stripping bars press the severed material down upon said cuber knives as the stripping bars clean the material from the cutters.

WILLIAM W. TUCK.

Witnesses:
M. J. COLLINS,
ROBERT S. TUCK.